United States Patent [19]

Takano

[11] 4,194,613
[45] Mar. 25, 1980

[54] APPARATUS FOR INTERMITTENTLY TRANSFERRING CONTAINERS

[75] Inventor: Motoharu Takano, Machida, Japan

[73] Assignee: Q.P. Corporation, Tokyo, Japan

[21] Appl. No.: 935,137

[22] Filed: Aug. 21, 1978

[30] Foreign Application Priority Data

Sep. 22, 1977 [JP] Japan .................. 52-128122[U]

[51] Int. Cl.$^2$ ............................................. B65G 47/26
[52] U.S. Cl. .................................... 198/425; 198/459
[58] Field of Search .............. 198/345, 425, 459, 460, 198/491, 492, 480, 532; 193/32, 35 A, 40; 221/7

[56] References Cited

U.S. PATENT DOCUMENTS

| | | | |
|---|---|---|---|
| 2,052,840 | 9/1936 | Nussbaum | 198/425 |
| 2,536,250 | 1/1951 | Archer | 198/491 X |
| 3,279,581 | 10/1966 | Drennan | 198/491 X |
| 3,343,644 | 9/1967 | Kljuchnikov et al. | 193/35 A |
| 4,083,389 | 4/1978 | Rosen et al. | 198/425 X |

FOREIGN PATENT DOCUMENTS

| | | | |
|---|---|---|---|
| 662254 | 12/1951 | United Kingdom | 198/425 |
| 724000 | 2/1955 | United Kingdom | 198/460 |

*Primary Examiner*—James L. Rowland
*Attorney, Agent, or Firm*—Browdy and Neimark

[57] ABSTRACT

An apparatus for intermittently transferring a suitable number of cylindrical plastic containers using a conveyor, which comprises a vessel stopping and transferring wheel which is rotatably disposed on one side of the conveyor, on which the cylindrical vessels are placed, and which has in the peripheral portion thereof arc-shaped recesses which are engageable with the side surface of the cylindrical vessels; a cam having flat surfaces and operatively connected to the vessel stopping and transferring wheel via toothed wheels; a buffer having at the free end portion thereof a roller slidingly engageable with the flat surfaces of the cam; and a control for disengaging the roller from the flat surfaces of the cam. Owing to the buffer operatively connected to the vessel stopping and transferring wheel via the cam, shocks given to the vessel stopping and transferring wheel when the vessels are thereby stopped are damped remarkably to prevent the vessel stopping and transferring wheel as well as other parts from being worn, damaged or loosened.

2 Claims, 2 Drawing Figures

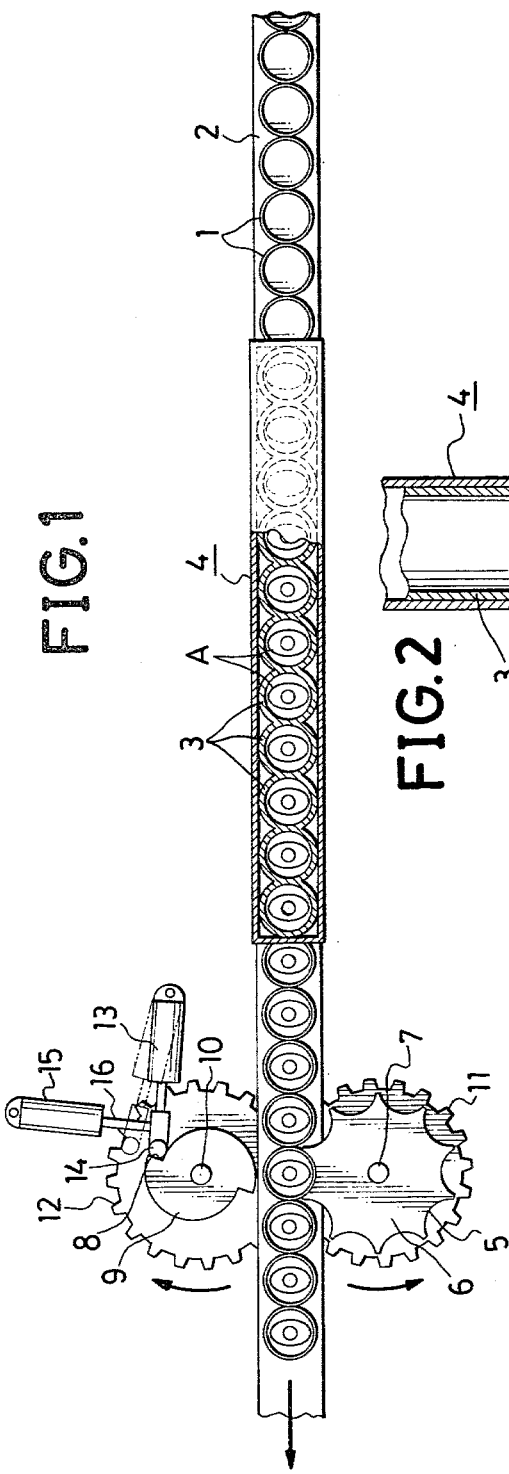
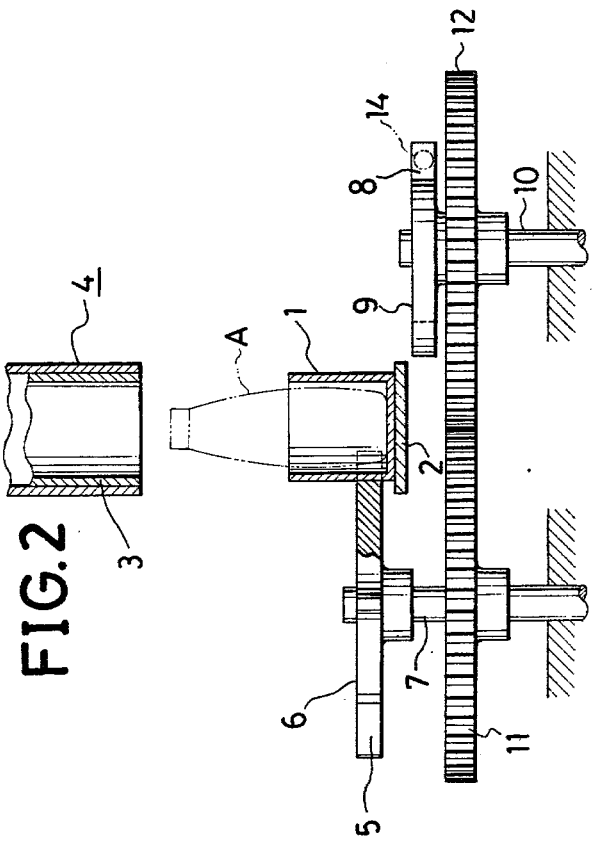

APPARATUS FOR INTERMITTENTLY TRANSFERRING CONTAINERS

BACKGROUND OF THE INVENTION

1. Field of the Invention

The present invention relates to an apparatus for intermittently transferring a suitable number of plastic containers using a conveyor.

2. Description of the Prior Art

In a prior art apparatus for intermittently transferring a suitable number of vessels which are successively placed on a conveyor and which contain a filled plastic container a stopper is retractably provided on the conveyor. The stopper is upwardly projected from the conveyor to stop vessels being transferred by the conveyor. When a suitable number of vessels are thus stopped, they are further transferred while releasing the stopper from the vessel stopping action. A suitable number of vessels are intermittently transferred in this manner.

However, in the above apparatus using a simple stopper, great shocks are given to the stopper by the vessels. Consequently, the stopper is worn or damaged in a short time and the vessels cannot be transferred smoothly and regularly.

SUMMARY OF THE INVENTION

An object of the present invention is to eliminate the above-mentioned drawbacks encountered in a prior art apparatus.

Another object of the present invention is to provide an apparatus for intermittently transferring a suitable number of plastic containers using a conveyor, which is characterized in that a means for intermittently stopping cylindrical vessels successively placed on a moving conveyor is operatively connected to a buffer means to absorb and damp the shocks given to the vessel stopping means when the vessels are thereby stopped, and prevent the vessel stopping and transferring means as well as other parts from being worn, damaged or loosened.

Still another object of the present invention is to provide an apparatus for intermittently transferring a suitable number of plastic containers using a conveyor, which is provided with a vessel stopping and transferring wheel having successive arc-shaped recesses in the peripheral portion thereof which can be fitted on the side surface of cylindrical vessels being transferred, so as to surely stop and smoothly transfer the vessels.

A further object of the present invention is to provide an apparatus for intermittently transferring a suitable number of plastic containers using a conveyor, in which a vessel stopping and transferring wheel is kept rotated while cylindrical vessels are transferred, so that arc-shaped recesses in the wheel are successively engaged with the side surface of the vessels, which are placed in succession on the conveyor, to orderly and accurately carry out an intermittent transfer of a suitable number of containers.

To these ends, the present invention provides an apparatus for intermittently transferring a suitable number of cylindrical plastic containers using a conveyor, which comprises a vessel stopping and transferring wheel which is rotatably disposed on one side of the conveyor, on which the cylindrical vessels are placed, and which has in the peripheral portion thereof arc-shaped recesses which is engageable with the side surface of the cylindrical vessels; a cam having flat surfaces and operatively connected to the vessel stopping and transferring wheel via toothed wheels; a buffer means having at the free end portion thereof a roller slidingly engageable with flat surfaces of the cam; and a control means for disengaging the roller from flat surfaces of the cam.

The above and other objects as well as advantageous features of the invention will becom apparent from the following description of the preferred embodiment taken in conjunction with the accompanying drawings.

BRIEF DESCRIPTION OF THE DRAWINGS

FIG. 1 is a plan view in partially cross section of an apparatus according to the present invention; and FIG. 2 is a front elevational view in cross section of a principal portion of the apparatus shown in FIG. 1.

DESCRIPTION OF THE PREFERRED EMBODIMENT

An embodiment of the present invention will be described with reference to the accompanying drawings.

Reference numeral 1 denotes cylindrical vessels which are capable of containing filled plastic containers A and which are placed on and transferred by a conveyor 2. Above the conveyor 2, a filled container supplying means 4 having a suitable number of successive holes 3 through which the filled containers A are supplied into the vessels 1.

On one side of an end portion of the conveyor 2 which is near the front end portion of the filled container supplying means 4, a vessel stopping and transferring wheel 6 rotatably mounted on a shaft 7 is disposed. The wheel 6 has in the peripheral portion thereof arc-shaped recesses 5 engageable with the side surface of the vessels 1 and is operatively connected via toothed wheels 11, 12 to a rotary shaft 10 on which a cam 9 having flat surfaces 8 is mounted.

Near the periphery of the cam 9, a roller 14 connected to a buffer means 13 is disposed. The roller 14 can be brought into contact with the cam 9 by a control means 15 consisting of a cylinder or the like. When the filled container supplying means 4 has finished supplying filled containers A into the vessels 1, the control means 15 is operated to disengage the roller 14 from the flat surface 8 of the cam and bring the roller 14 into contact with the peripheral surface thereof. The cam 9 is adjusted beforehand so that the flat surface 8 is opposed to the roller 14 every time the vessels 1, the number of which corresponds to that of the holes 3 provided in the filled container supplying means 4, have been transferred.

The buffer means 13 consists of a piston type hydraulic damper the base end portion of which is supported on a shaft. When the roller 14 provided at the free end of a piston rod 16 comes into engagement with the flat surface 8 of the cam 9, the shocks given to the roller 14 are absorbed and damped by the buffer means 13.

When filled containers A, for example, bottles filled with mayonnaise are supplied by the filled container supplying means 4 through the holes 3 into the vessels 1 on the conveyor 2 in the above-described embodiment, the roller 14 of the buffer means 13 is engaged with the flat surface 8 of the cam 9 to stop the vessel stopping and transferring wheel 6. At this time, an arc-shaped recess 5 is fitted on the side surface of a vessel 1, which is thereby prevented from being transferred irrespective of the movement of the conveyor.

When the supplying of the filled containers A into the vessels 1 has been finished, the control means 15 is operated to allow the roller 14 to be disengaged from the flat surface 8 of the cam 9. At this time, the vessel stopping and transferring wheel 6 is rendered rotatable and the vessels 1 with filled containers A placed therein being to be transferred in succession by the conveyor 2. With the movement of the vessels 1, the vessel stopping and transferring wheel 6 is rotated to move the cam 9 until the flat surface 8 thereof is opposed to the roller 14. When the roller 14 is then engaged with the flat surface 8 of the cam 9 again, the rotary movement of the vessel stopping and transferring wheel 6 is stopped. Thus, the movement of the vessels 1 on the conveyor 2 is stopped. The filled container supplying means 4 is then operated again to drop filled containers A into the vessels 1 which are positioned below the holes 3. A suitable number of vessels 1 placed on and transferred by the conveyor 2 are intermittently stopped in the above manner to supply filled containers A thereinto. The resulting vessels 1 are transferred again in the same manner.

The shocks occurring due to the inertia of rotation of the cam 9 when the roller 14 is engaged with the flat surface 8 of the cam 9 to stop the vessels 1 on the conveyor 2 by the vessel stopping and transferring wheel 6 are absorbed and damped by the buffer means 13.

In the above embodiment, vessels with filled containers A are engaged with a vessel stopping and transferring wheel 6. However, when the filled containers A are cylindrically made of a hard material, they may be directly placed on the conveyor 2 without using vessels 1. The apparatus according to the present invention may, of course, be utilized to intermittently transferring containers other than the filled ones mentioned above.

The present invention is not, of course, limited to the above-described embodiment; it may be modified in various ways within the scope of the appended claims.

What is claimed is:

1. An apparatus for intermittently transferring cylindrical plastic containers using a conveyor, which comprises a vessel stopping and transferring wheel which is rotatably disposed on one side of said conveyor, on which cylindrical vessels are placed, and which has in the peripheral portion thereof arc-shaped recesses which are engageable with the side surfaces of said cylindrical vessels; a cam having flat surfaces and operatively connected to said vessel stopping and transferring wheel via toothed wheels; a buffer means having at a free end portion thereof a roller slidingly engageable with the flat surfaces of said cam; and a control means for disengaging said roller from the flat surfaces of said cam.

2. An apparatus according to claim 1, wherein said buffer means consists of a piston type hydraulic damper supported on a shaft at a base end thereof and having a roller at the free end of a piston rod thereof, said roller being engageable with the flat surfaces of said cam.

* * * * *